United States Patent
Gann et al.

(10) Patent No.: US 7,154,545 B2
(45) Date of Patent: Dec. 26, 2006

(54) IMAGE SCANNER PHOTOSENSOR ASSEMBLY WITH IMPROVED SPECTRAL ACCURACY AND INCREASED BIT-DEPTH

(75) Inventors: Robert G Gann, Bellvue, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1202 days.

(21) Appl. No.: 09/845,391

(22) Filed: Apr. 30, 2001

(65) Prior Publication Data

US 2002/0158978 A1 Oct. 31, 2002

(51) Int. Cl.
*H04N 9/083* (2006.01)
*H04N 3/14* (2006.01)

(52) U.S. Cl. .................. 348/271; 348/278; 348/275

(58) Field of Classification Search ............. 348/278, 348/275, 271, 265, 315
See application file for complete search history.

(56) References Cited

U.S. PATENT DOCUMENTS

| | | | | |
|---|---|---|---|---|
| 4,432,017 A | | 2/1984 | Stoffel et al. ............... | 358/213 |
| 4,994,907 A | | 2/1991 | Allen ........................ | 358/41 |
| 5,025,282 A | * | 6/1991 | Nakamura et al. .......... | 355/38 |
| 5,055,921 A | * | 10/1991 | Usui ......................... | 358/512 |
| 5,602,391 A | * | 2/1997 | Pines et al. ................ | 250/332 |
| 5,652,664 A | * | 7/1997 | Kusaka et al. ............. | 358/483 |
| 5,753,906 A | | 5/1998 | Gennetten .................. | 250/226 |
| 5,889,554 A | | 3/1999 | Mutze ....................... | 348/273 |
| 6,507,011 B1 | * | 1/2003 | Ang ........................... | 250/208.1 |
| 6,570,615 B1 | * | 5/2003 | Decker et al. .............. | 348/272 |

OTHER PUBLICATIONS

IEEE Transactions On Image Processing, vol. 6, No. 12, Dec. 1997; "Restoration Of A Single Superresolution Image From Several Blurred, Noisy, and Undersampled Measured Images"; Michael Eland and Arie Feuer; p. 1646-1658.

U.S. Appl. No. 09/703,960; "Photosensor Assembly With Shared Structures"; Kurt E. Spears.

* cited by examiner

*Primary Examiner*—Vivek Srivastava
*Assistant Examiner*—James M. Hannett
(74) *Attorney, Agent, or Firm*—Augustus W. Winfield

(57) ABSTRACT

Photosensor assemblies have, for each color, multiple line-arrays of photosensors. For each color, the spectral bandwidth received by each line-array is different. The additional spectral bandwidths are used to improve the spectral measurement accuracy, and to increase bit-depth. In one example, one row of a staggered array receives light having a first spectral bandwidth, and a second row of the staggered array receives light having a different spectral response. In a second example, photosensors with different sizes receive light having different spectral bandwidths.

8 Claims, 4 Drawing Sheets

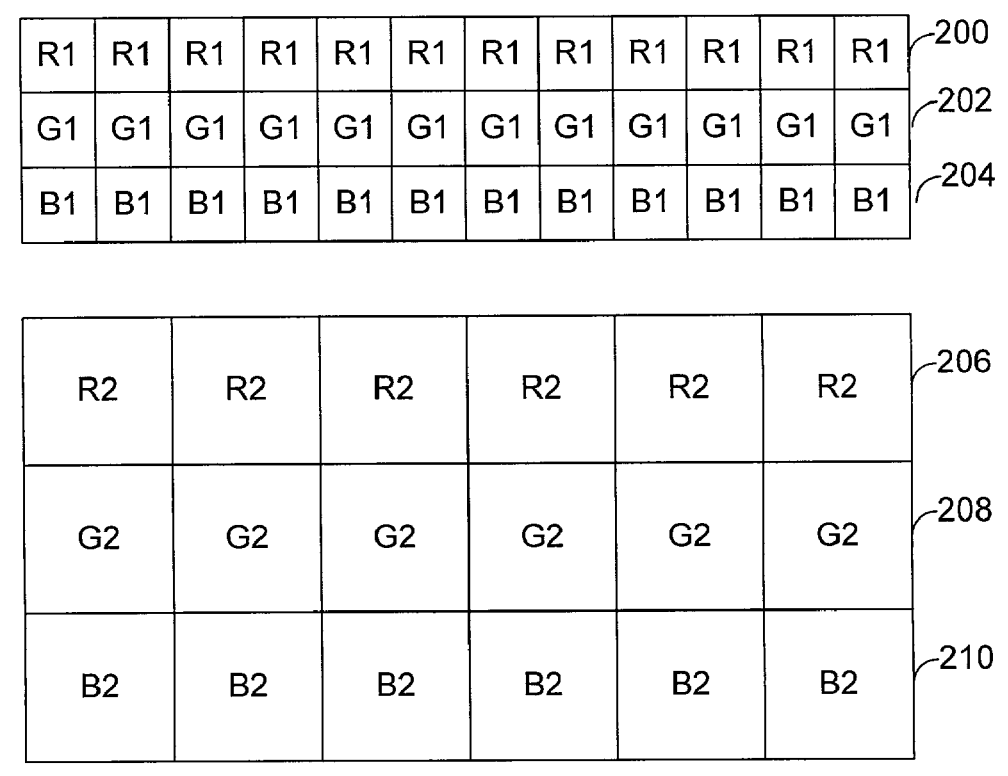

| R1 | R1 | R1 | R1 | R1 | R1 | R1 | R1 | R1 | R1 | R1 | R1 | ~200 |
|----|----|----|----|----|----|----|----|----|----|----|----|------|
| G1 | G1 | G1 | G1 | G1 | G1 | G1 | G1 | G1 | G1 | G1 | G1 | ~202 |
| B1 | B1 | B1 | B1 | B1 | B1 | B1 | B1 | B1 | B1 | B1 | B1 | ~204 |

| R2 | R2 | R2 | R2 | R2 | R2 | ~206 |
|----|----|----|----|----|----|------|
| G2 | G2 | G2 | G2 | G2 | G2 | ~208 |
| B2 | B2 | B2 | B2 | B2 | B2 | ~210 |

FIG. 2

IMAGE SCANNER PHOTOSENSOR ASSEMBLY WITH IMPROVED SPECTRAL ACCURACY AND INCREASED BIT-DEPTH

FIELD OF INVENTION

This invention relates generally to photosensor arrays used in image scanners, copiers, and facsimile machines, and more specifically to a photosensor assembly having an improved spectral accuracy.

BACKGROUND OF THE INVENTION

Image scanners, also known as document scanners, convert a visible image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. Transparency image scanners pass light through a transparent image, for example a photographic positive slide, through an optics system, and then onto an array of photosensitive devices. The optics system focuses at least one line, called a scanline, on the image being scanned, onto the array of photosensitive devices. The photosensitive devices convert received light intensity into an electronic signal. An analog-to-digital converter converts the electronic signal into computer readable binary numbers, with each binary number representing an intensity value.

In general, there is an ongoing demand for increased resolution and speed, improved color quality and image quality, and reduced cost, demands that often directly conflict and require trade-offs. The following background presents some of the factors affecting color, resolution, speed, image quality and cost.

First, consider psychophysical color matching (i.e., colors that appear to be the same to the human eye). The human eye contains three different kinds of color receptors (cones) that are sensitive to broad overlapping spectral bands. Specific sensitivities vary from person to person, but the average response for each receptor has been quantified and is known as the "CIE standard observer."

Typically, given a set of numerical values for photosensor responses for one pixel, for example, red, green, and blue, the numbers are mathematically treated as a vector. The vector is multiplied by a color transformation matrix to generate a different set of numbers. In general, the coefficients in the color transformation matrix compensate for differences between the response of photosensors and the response of the CIE standard observer, and the coefficients in the matrix may include compensation for the spectrum of the illumination source.

Metamers are visually identical, but spectrally different, stimuli. That is, it is possible to provide psychophysical color matching even though the color spectra are not identical. Measuring the actual spectrum, as opposed to just psychophysical color matching, provides additional data for more accurate color matching between systems that have different gamuts, for example color matching between displays and printers.

Accurate spectral reproduction requires a light source that has adequate intensity across the spectral bandwidth of the human eye, and photosensors with an adequate sensitivity across the spectral bandwidth of the human eye, and a display or printing system with adequate intensity across the spectral range of the human eye. Typically, light sources, photosensor arrays, displays, and printers all have limited color gamuts, and more particularly, all have spectral ranges that are narrower than the broad band spectral range of the human eye. One solution for light sources is to provide multiple light sources, each with a different spectral range (see, for example, U.S. Pat. No. 5,753,906). A similar solution for two-dimensional photosensor arrays for digital cameras is to provide additional photosensors with different sensitivity ranges. For example, if the photosensors that are sensitive to green light have an inadequate range of spectral sensitivity, then multiple different green sensitive photosensors may be used, each having a different spectral range (see, for example, U.S. Pat. No. 5,889,554). Typically, however, an additional spectral range increases cost (additional photosensors), or decreases resolution for one of the other colors (for example, green photosensors may be physically located where red or blue photosensors would normally be physically located).

Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned. Optical sampling rate as measured on the document being scanned is also called the input sampling rate.

The native input sampling rate is determined by the optics and the pitch of the individual sensors. A scanner operator may select a sampling rate that is less than the native input sampling rate by simply dropping selected pixels, or by using digital resampling techniques. Alternatively, a scanner operator may select a sampling rate that is greater than the native input sampling rate, where intermediate values are computed by interpolation. Typically, all the charges or voltages are read from the photosensor array, and are then digitized, and then subsampling or interpolation is performed on the resulting digital pixel data.

Bit-depth is the number of bits captured per pixel. Typically, a pixel is specified in a three-dimensional color space with a fixed number of bits in each dimension. For example, a pixel may be specified in red, green, blue (RGB) color space, with 8 bits of red information, 8 bits of green information, and 8 bits of blue information, for a total bit-depth of 24 bits per pixel. Alternatively, a pixel may be specified in a cylindrical color space in which the dimensions are luminance, chrominance, and saturation. Alternatively, a three-dimensional CIE color space may be used. Transformation matrices are used to transform between color spaces.

Even if a sensor is receiving no light, some thermal noise (called dark noise) may occur. Thermal noise (dark noise) is proportional to time. During exposure to light, the primary noise source (called shot noise) is related to conversion of photons to electrons, and the noise increases with the square root of the signal. Small sensors tend to have a lower signal-to-noise ratio than large sensors, particularly for low reflectance or low transmissivity areas of a document. Smaller sensor areas can provide higher input sampling rates, but other measures of image quality, and in particular color quality, as measured by signal-to-noise, may be reduced.

Scanning speed is affected by multiple factors: exposure time, shift time of registers multiplied by number of pixels being shifted, output amplifier speed, and analog-to-digital conversion time. Typically, for low native input sampling rates, the primary limiter is exposure time, that is, the time required to generate a signal that provides an acceptable signal-to-noise ratio. However, if the number of pixels being shifted and converted becomes very large, then the time required to shift and convert the individual pixel signals may become the limiting factor.

Areas of an image with slowly varying color, particularly dark colors, require high bit-depth and high signal-to-noise to accurately reproduce the smooth tone and texture of the original. For areas of slowly varying color, high input sampling rate is not needed because there is no high frequency information in the image. Areas of an image that change color rapidly, for example a forest scene, or a close-up photograph of a multi-colored fabric, need a high input sampling rate to capture the high frequency information, but high bit-depth and high signal-to-noise are not needed. That is, for high frequency information, the color accuracy of each individual pixel is less important. High input sampling rates require small sensor areas, which in turn have relatively low signal-to-noise ratios, relatively low bit-depth, and relatively low scanning speed. Large sensor areas provide high signal-to-noise, high bit-depth, and high speed, but cannot provide high input sampling rates.

There is a need for a scanner that provides accurate spectral reproduction, high bit-depth, high speed, high signal-to-noise, and high native input sampling rate, with minimal increase in cost.

SUMMARY OF THE INVENTION

In photosensor assemblies in accordance with the invention, for each color, there are multiple line-arrays of photosensors. For each color, the spectral bandwidth received by each line-array is different. The additional spectral responses improve the spectral measurement accuracy, and increase the bit-depth, with little or no incremental cost, and with little or no negative impact on native input sampling rate or signal-to-noise.

Two example embodiments are provided. In one example, one row of a staggered array receives light having a first spectral bandwidth, and a second row of the staggered array receives light having a different spectral response. Given multiple staggered line-arrays, additional spectral bandwidths provide increased spectral accuracy at nominal incremental cost with little or no impact on signal-to-noise or the native input sampling rate.

In a second example embodiment, photosensors with different sizes receive light having different spectral bandwidths. For the second example embodiment, line-arrays with relatively small sensor areas may be used for high native input sampling rates, and line-arrays with relatively large sensor areas may be used for high signal-to-noise and high speed, and photosensors of all sizes may be used in combination to improve spectral accuracy and increased bit-width. Combining multiple sensor sizes and multiple spectral responses on one assembly enables a great deal of freedom for an operator to select combinations of accurate spectral measurement, high bit-depth, high speed, high signal-to-noise, and high native input sampling rate, with minimal increase in cost, all with fewer tradeoffs. Given multiple rows of different size photosensors, additional spectral bandwidths provide increased spectral accuracy at nominal incremental cost with little or no impact on signal-to-noise or on the native input sampling rate.

BRIEF DESCRIPTION OF THE DRAWINGS

FIG. 2 is a block diagram of a second example embodiment of a photosensor assembly in accordance with the invention.

DETAILED DESCRIPTION OF THE PREFERRED EMBODIMENT OF THE INVENTION

Figure 1:
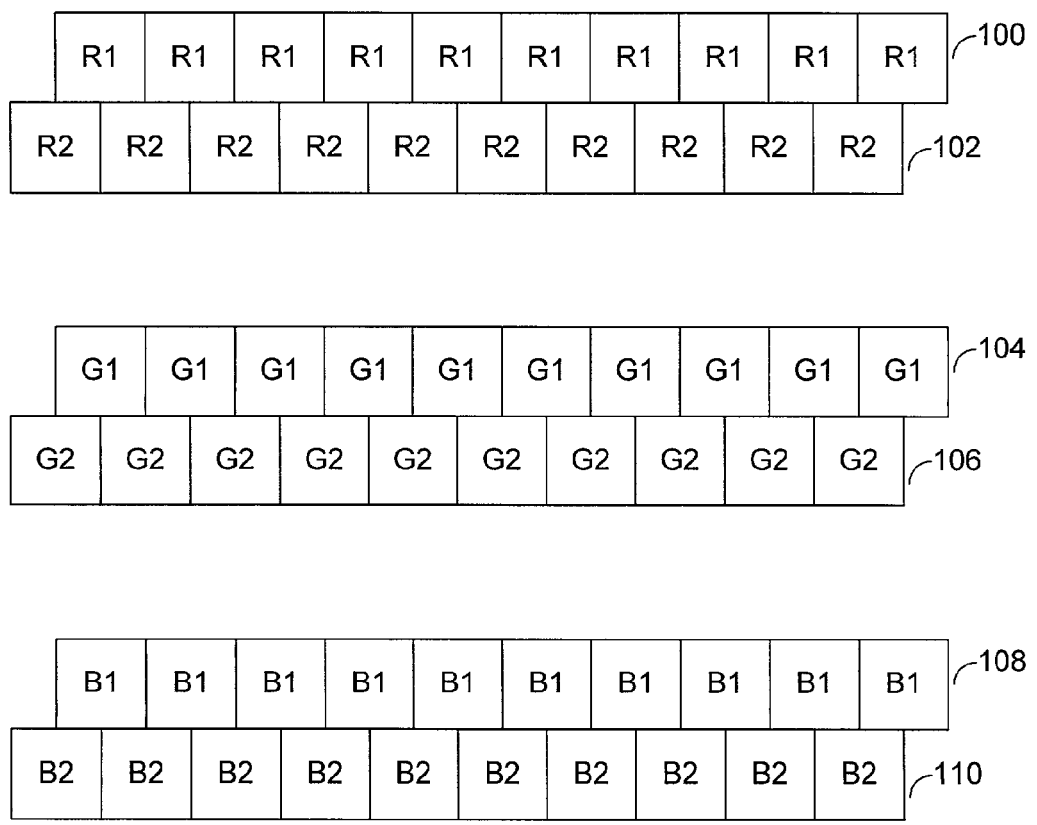
FIG. 1 is a block diagram of a first example embodiment of a photosensor assembly in accordance with the invention.

FIG. 1 illustrates sets (three pairs in the example of FIG. 1) of staggered rows of photosensors. In the example of FIG. 1, the pitch of the photosensors in each row, and the photosensor width, is the same, and one row is offset by one-half the pitch of the photosensors, or by one-half the width of the photosensors. To facilitate illustration, structural details other than the photosensors have been omitted in FIG. 1. The geometric arrangement of staggered rows of photosensors, as depicted in FIG. 1, is known for use in image scanners. The photosensors may overlap as illustrated, or may be in a checkered configuration with no overlap (see, for example, U.S. Pat. Nos. 4,432,017 and 4,994,907). Conventionally, all photosensors, within one set of staggered rows of photosensors, receive light having the same spectral bandwidth, as a result of beam splitting or filtering. For example, conventionally, all the photosensors in the set of rows 100 and 102 would receive light having the same spectral bandwidth. In contrast, in accordance with the invention, within one set of staggered rows of photosensors, all the photosensors in one row receive one spectral bandwidth, and the photosensors in a second row receive a different spectral bandwidth. For example, in FIG. 1, row 100 receives red light having a first bandwidth (designated R1), and row 102 receives red light having a second bandwidth (designated R2). Similarly, rows 104 and 106 receive two different bandwidths of green light (G1 and G2), and rows 108 and 110 receive two different bandwidths of blue light (B1 and B2). With filters as illustrated, the assembly measures six spectral bands instead of three, without changing the sampling rate or the conventional structure. Spectral bands may overlap (for example, the two red bands for rows 100 and 102 may overlap). The overall bandwidth of two overlapping bands is preferably greater than either band alone. However, even if the overall bandwidth is not increased, measuring two separate bandwidths provides a more precise spectral measurement than measuring one bandwidth.

The assembly of FIG. 1 generates two images. One image has a first set of tri-stimulus values (R1,G1,B1), and the second image has a second set of tristimulus values (R2, G2,B2). The two images have the same native input sampling rates, and the two images are offset by one-half pixel in one dimension. Either image could be used alone, with each image requiring a different transformation matrix. Alternatively, the two images can be combined, to provide one combination image having twice the input sampling rate of either of the two component images, and six spectral measurements per pixel. Providing six spectral measurements per pixel increases bit-depth. For example, if 16 bits are used for each spectral bandwidth, then each pixel in the combined image has 96 bits of color information, doubling the bit-depth relative to conventional staggered pixel assemblies. Note also that the additional bits provide additional spectral information that may be used for improved spectral accuracy.

The two images can be simply interlaced. Alternatively, for sampling rates other than the native input sampling rate, combined with compensation for optical aberrations, and perhaps computations for user-specified filtering, more general re-sampling techniques may be used. For an example of general re-sampling, see Michael Elad and Arie Feuer, "Restoration of a Single Superresolution Image from Several Blurred, Noisy, and Under sampled Measured Images," *IEEE Transactions on Image Processing*, vol. 6, no. 12, pp 1646–1658, December, 1997.

Note that the increased spectral accuracy and bit-depth may be provided at nominal incremental cost. In particular, if color filters are used, the areas being filtered do not change (no structural changes), and the only change to the photosensor assembly is the spectral bandwidth of the filters. For a scanner system in which the photosensor assembly is used, two separate 3×3 color transformation matrices are needed for the two different sets of tristimulus values, and a 6×3 color transformation matrix is needed when all six spectral bandwidths are used. The output of the 6×3 transformation matrix is then in a standard format so that nothing downstream of the 6×3 matrix has to be changed. The only difference is that the spectral accuracy of the output of the 6×3 matrix is increased relative to the output of a 3×3 matrix. For the example numbers given above, there may be 16 bits for each spectral bandwidth, so that the input to the 6×3 matrix is six 16-bit numbers, and the output is three 16-bit numbers, with improved spectral accuracy.

Figure 3:
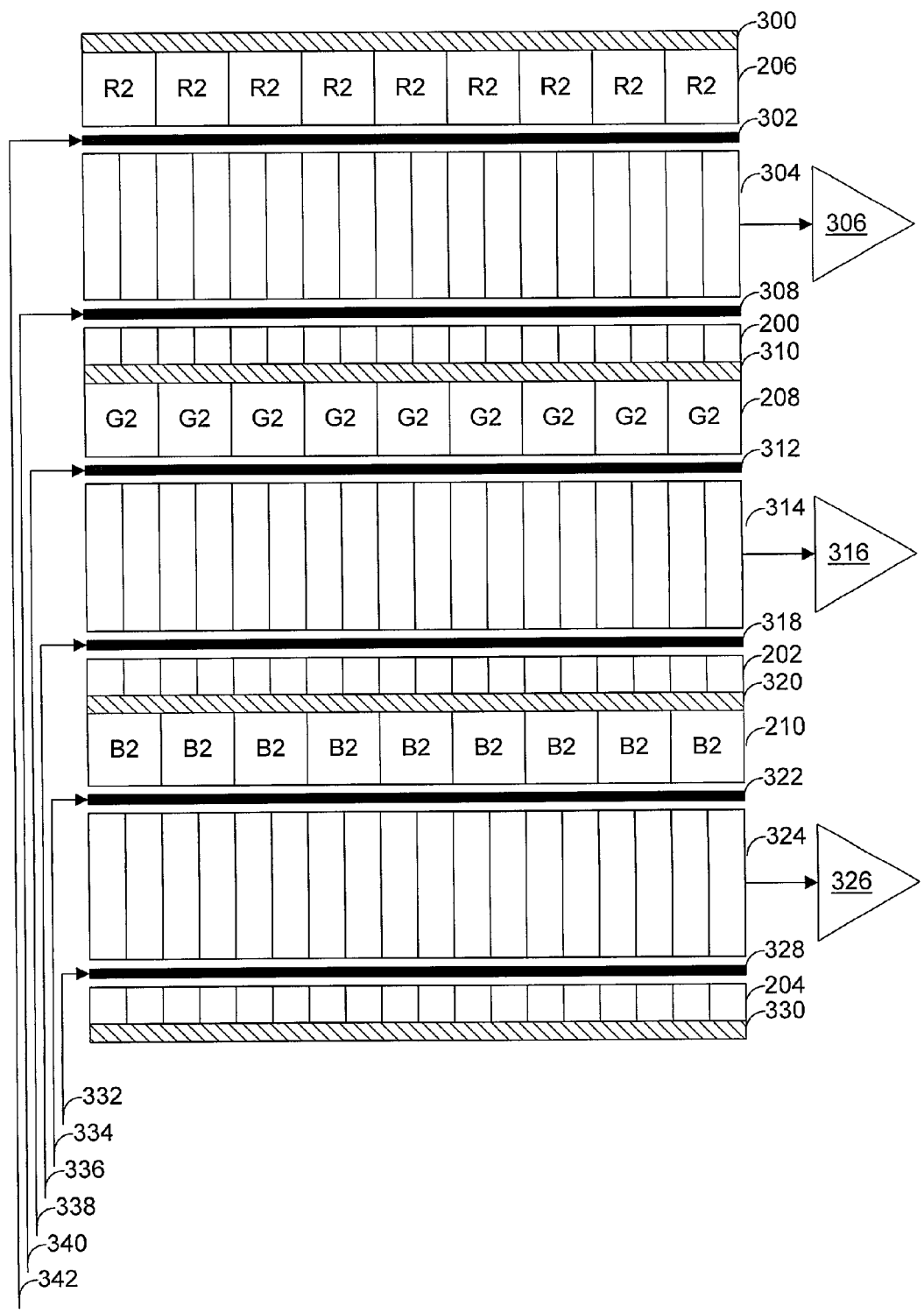
FIG. 3 is a block diagram showing additional structural detail for an example embodiment as in FIG. 2.

FIG. 2 illustrates an alternative example embodiment. As discussed in the background section, there may be trade-offs among input sampling rate, scanning speed, and signal-to-noise. The example structure in FIG. 2 provides multiple different sizes of photosensors and multiple different native input sampling rates within one assembly. The example structure of FIG. 2, but not the multiple spectral bandwidth features, is the subject of commonly assigned U.S. patent application Ser. No. 09/703,960, filed Oct. 31, 2000. FIG. 3 provides an example of additional detail for a structure as illustrated in FIG. 2. The example structure of FIGS. 2 and 3 enables one scanner to provide images having relatively high signal-to-noise but at a relatively lower native input sampling rate, or images having a relatively high native input sampling rate, but with reduced signal-to-noise. Of particular interest in the present application is providing additional benefits of increased spectral accuracy and increased bit-depth combined with the benefits of multiple different sizes of photosensors and multiple different native input sampling rates within one assembly. In particular, given multiple sensor arrays as illustrated in FIGS. 2 and 3, increased spectral accuracy and increased bit-depth can be provided at a nominal incremental cost. As discussed in conjunction with FIG. 1, if filters are used for the assembly illustrated in FIG. 2, the only change required is the spectral response of the filters, and different transformation matrices in the scanner using the photosensor assembly.

In the example of FIG. 2, there are six line-arrays of photosensors, with each line-array sensing a different spectral bandwidth. Photosensor line-arrays 200 and 206 sense two different spectral bandwidths of red light (designated R1 and R2). Photosensor line-arrays 202 and 208 sense two different spectral bandwidths of green light (designated G1 and G2). Photosensor line-arrays 204 and 210 sense two different bands of blue light (designated B1 and B2).

In the example embodiment of FIG. 2, photosensors in line-arrays 200, 202, and 204 have relatively small areas. Photosensors in line-arrays 206, 208, and 210 have relatively large areas. The line-arrays with relatively small sensor areas may be used for high native input sampling rates, and the line-arrays with relatively large sensor areas may be used for high signal-to-noise and speed. Alternatively, as described in more detail below, all line-arrays of sensors may be used to increase spectral accuracy and increase bit-depth. Relative to the small sensors, the large sensor areas provide relatively better signal-to-noise but at a relatively lower native input sampling rate. Conversely, the smaller sensor areas provide a relatively high native input sampling rate, but with reduced signal-to-noise.

For increased spectral accuracy and increased bit-depth, all the line-arrays of photosensors are used (either during one scan, or during two separate passes). Then, for the example illustrated in FIG. 2, two images are obtained, a first image having a first native input sampling rate and a first color gamut, and a second image, having a second native input sampling rate and a second color gamut. The data for the two images can be combined in several ways. First, the two images can be combined to form one image at the high native input sampling rate. For example, each data sample from a large photosensor can be replicated to provide pixels that are the same size as determined by the small photosensors. If, for example, the area of each large photosensor is four times the area of each small photosensor, each pixel from a large photosensor can be replicated to form four identical small pixels. Alternatively, the two images can be combined to form one image at the low native input sampling rate. For example, the data for four small pixels can be averaged to form one large pixel. Bi-linear interpolation may be used on both images, or on a combination image, to provide sampling rates other than one of the two native input sampling rates. Finally, general re-sampling techniques may be used as discussed in conjunction with FIG. 1.

For any of the techniques for combining the images, each of the resulting pixels includes six different color measurements, increasing spectral accuracy and bit-width. As a result, one photosensor assembly as illustrated in FIG. 2 enables an operator to select combinations of accurate spectral measurement, high bit-depth, high speed, high signal-to-noise, and high native input sampling rate, with minimal increase in cost.

In each of FIGS. 1 and 2, the number of photosensor line-arrays, the choice of colors, and the arrangement of the colors is for illustration only. For example, a photosensor assembly in accordance with the invention may sense multiple bands of yellow, magenta, and cyan light. Alternatively, at least one photosensor line-array may sense white light. Alternatively, at least one photosensor line-array may be dedicated to sensing the spectrum of a source of illumination. Light to a few photosensors in each line-array may be blocked for calibration of dark current, or a few photosensors in each line-array may receive light that is filtered differently for calibration purposes. There may be fewer than six line-arrays of photosensors, or there may be more than six line-arrays. The line-arrays may curve, for example, to compensate for distortion in an optical system. Note that filter transmissivity or beam splitting efficiency may vary from color to color. Therefore, the exposure time may be different for each photosensor line-array to enable each sensor to generate sufficient electrons to provide a specified signal level at a specified maximum illumination intensity on the document being scanned.

A photosensor assembly as illustrated in FIG. 2 could be assembled by simply fabricating two separate assemblies (one for small sensors and one for large sensors) onto one semiconductor die. However, the dominant cost of an integrated circuit is the die area on a wafer. As discussed below, some structures may be shared to reduce area, and therefore reduce cost. For photosensor arrays using Charge-Coupled Device (CCD) technology, it is common to transfer charges to a charge shift register and serially shift the charges to a few sense nodes for analog-to-digital conversion. For CCD arrays, the charge shift registers and associated amplifiers are relatively large structures. Accordingly, if charge shift registers and associated amplifiers can be shared, then additional photosensor arrays can be added with very little incremental cost.

FIG. 3 illustrates an example of additional structure, with shared charge shift registers and associated amplifiers, for an embodiment as in FIG. 2. In FIG. 3, reference numbers 200–210 correspond to like numbered line-arrays of photosensors in FIG. 2. In FIG. 3, there are three charge shift registers (304, 314, and 324). Register 304 shifts charges to amplifier 306, register 314 shifts charges to amplifier 316, and register 324 shifts charges to amplifier 326. Transfer gates (302, 308, 312, 318, 322, and 328) transfers charges from the photosensor areas to the charge shift registers. For example, transfer gate 302 transfers charges from photosensors 206 to charge shift register 304. Control lines 332-342 control the transfer gates. Note that independent control lines may be preferred if independent exposure times are needed for each photosensor array.

In the example embodiment illustrated in FIG. 3, each line-array of large area photosensors shares a charge shift register and an amplifier with a line-array of small area photosensors for the same general color. For example, charge shift register 304 is shared by the large red photosensors 206 and the small red photosensors 200. Given additional line-arrays, the spectral accuracy can be increased and bit-depth can be increased by using multiple spectral bandwidths, as discussed above. When charge shift registers are shared, and when all the photosensors are used, the photosensor arrays sharing one charge shift register may use the shared register serially. For example, in FIG. 3, line-array 410 may use register 406 first, and then line-array 402 may use register 406. Alternatively, charges may be interleaved. Either way, for each exposure, each shift register stage receives charge from two different line-arrays.

Note in the example embodiment illustrated in FIG. 3 that the number of stages in each charge shift register is at least as great as the number of photosensor areas in a line-array of small photosensors. For example, the number of stages in shift register 304 is at least as great as the number of photosensors in line-array 200. In FIG. 3, each small photosensor area transfers charge into one charge shift register stage, and each large photosensor area transfers charge into two charge shift register stages. When scanning with the large photosensor areas, the charges from pairs of charge shift register stages are added before conversion. There are many suitable variations, and in particular, the number of stages in the charge shift registers may be greater than the number of associated photosensors, and shift register stages may be interlaced.

With intense light or long exposures, photosensor charge wells may saturate, and excess charge may spill over into adjacent photosensor charge wells, resulting in blooming (resulting bright areas in the digitized image are larger than the actual bright areas). In CCD arrays, it is common to provide overflow drains (also called antibloom drains) to bleed off any excess charges to prevent blooming. Barrier heights of overflow drains may be controlled by an external voltage to provide variable integration times. Overflow drains may be fabricated below the charge wells (called a vertical overflow drain) or adjacent to photodetectors (called a lateral overflow drain). Lateral overflow drains take up die area on the semiconductor substrate. In FIG. 3, areas 300, 310, 320, and 330 represent lateral overflow drains. Note that photosensor line-arrays 200 and 208 share overflow drain 310, and line-arrays 202 and 210 share overflow drain 320.

Figure 4:
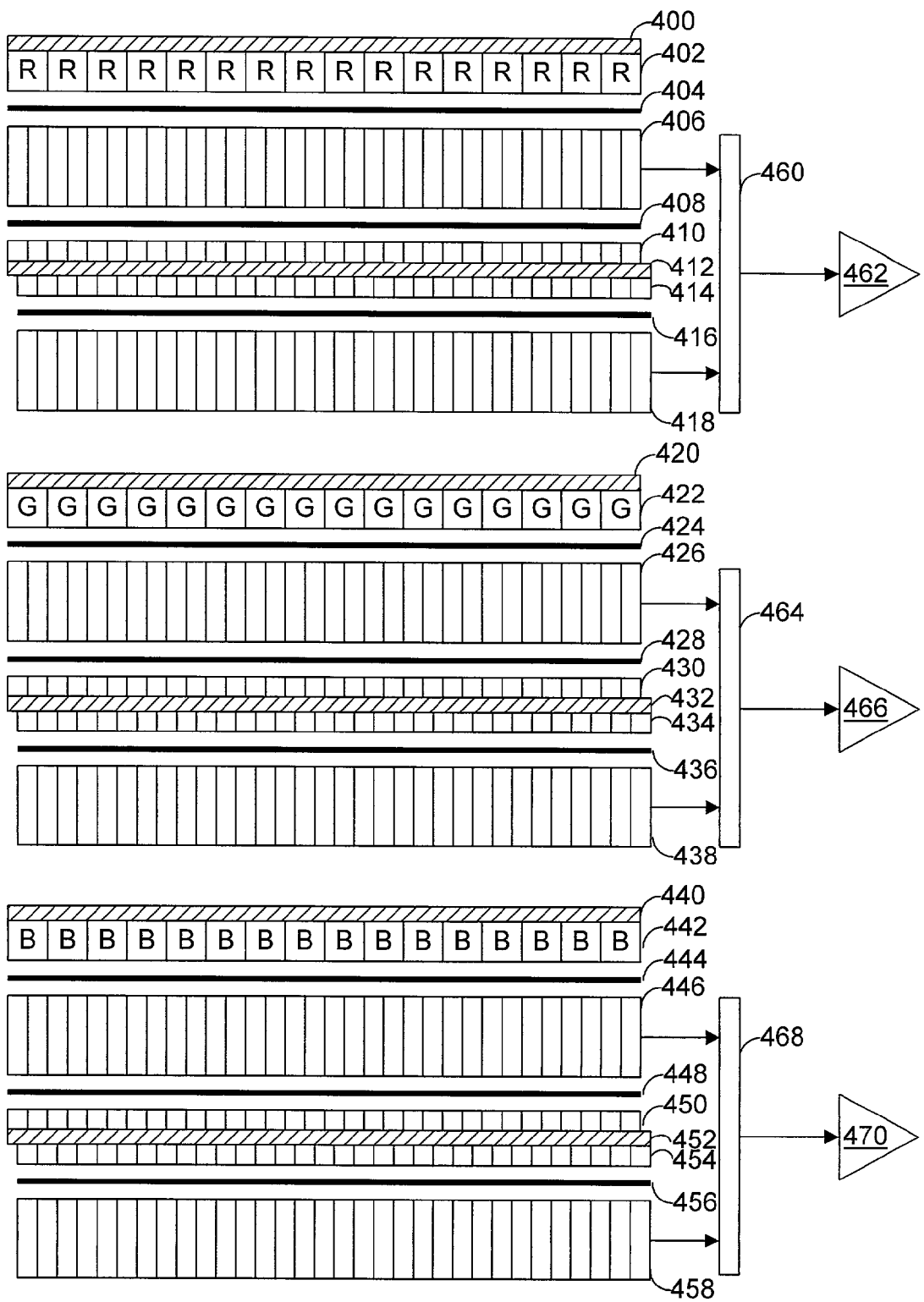
FIG. 4 is a block diagram for an example embodiment combining features from FIGS. 1, 2, and 3.

It may be desirable to have the higher-sampling-rate photosensors configured as staggered arrays as in FIG. 1, and the lower-sampling-rate photosensors configured as linear arrays as in FIG. 2. FIG. 4 provides an example embodiment, with staggered photosensor arrays as illustrated in FIG. 1, multiple sizes of photosensor arrays as illustrated in FIG. 2, multiple spectral bandwidths as illustrated in FIGS. 1 and 2, and shared structures as illustrated in FIG. 3. In FIG. 4, there are three sets of staggered line-arrays of photosensors (410, 414), (430, 434), and (450, 454). There are also three line-arrays of large photosensors (402, 422, 442). Elements 406, 418, 426, 438, 446, and 458 are charge shift registers. Elements 400, 412, 420, 432, 440, and 452 are lateral overflow drains. Elements 404, 408, 416, 424, 428, 436, 444, 448, and 456 are charge transfer registers. Each line array of large photosensors transfers charges to a single charge shift register (line array 402 to register 406, line array 422 to register 426, and line array 442 to register 446), which is shared with a staggered line-array of photosensors. Each set of staggered line-arrays transfers charges to two charge shift registers, one of which is shared with a line array of large photosensors. For example, staggered line-arrays 410 and 414 transfer charges to shift registers 406 and 418, and register 406 is shared with large line-array 402. When the large photosensors are used, charge transfer registers (460, 464, and 468) transfer charge to their respective amplifiers (462, 466, 470). When the small staggered photosensors are used, the charge transfer registers multiplex charges to the amplifiers.

With small photosensors configured as staggered arrays, and larger photosensors configured as linear arrays, both line arrays within a set of staggered line-arrays may receive the same spectral bandwidth. Alternatively, they may receive separate spectral bandwidths to provide even more spectral accuracy and bit-depth. For example, line-array 410 may receive a spectral bandwidth of red light that is different than the spectral bandwidth of line array 402. Likewise, line-array 414 may receive a spectral bandwidth of red light that is different than either line array 402 or line array 410. Similarly, line arrays 430 and 434 may receive different spectral bands of green light, and line arrays 450 and 454 may receive different spectral bands of blue light. As a result, when all photosensors are used, each resulting pixel includes nine spectral measurements.

The configuration of FIGS. 2, 3, and 4 enable one scanner to provide images having relatively high signal-to-noise but at a relatively lower native input sampling rate, or images having a relatively high native input sampling rate, but with reduced signal-to-noise. Given multiple sensor arrays as illustrated in FIGS. 2, 3, and 4, increased spectral accuracy and increased bit-depth can be provided at a nominal incremental cost, with little or no impact on signal-to-noise or input sampling rate. The only change required is the spectral response of the filters, and different transformation matrices in the scanner using the photosensor assembly.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photosensor assembly, comprising:
   a plurality of sets of lines of photosensors, each set comprising at least a first line and a second line, where photosensors in the first line and the second line have substantially the same pitch, and where photosensors in the first line are offset relative to photosensors in the second line by approximately one-half the pitch, and where the spectral bandwidth of light received by the first line is different than the spectral bandwidth of the light received by the second line.

2. A photosensor assembly as in claim 1, further comprising:
   N lines of photosensors, where N is at least six, each photosensor in one of the N lines receiving a different spectral bandwidth of light than photosensors in the other N−1 lines.

3. A photosensor assembly, comprising:
   a plurality of sets of lines of photosensors, each set comprising at least a first line and a second line, where photosensors in the first line and the second line, have substantially the same photosensor width, and where photosensors in the first line are offset relative to photosensors in the second line by approximately one-half the photosensor width, and where the spectral bandwidth of light received by the first line is different than the spectral bandwidth of the light received by the second line.

4. A photosensor assembly as in claim 3, further comprising:
   N lines of photosensors, where N is at least six, each photosensor in one of the N lines receiving a different spectral bandwidth of light than photosensors in the other N−1 lines.

5. A photosensor assembly, comprising:
   N first lines of photosensors having a first size;
   M second lines of photosensors having a second size:
   where M and N are both greater than one;
   where the second size is different than the first size;
   where, within each line of photosensors, essentially all photosensors receive the same spectral bandwidth of light; and
   where at least M+N different spectral bandwidths of light are received.

6. A method of scanning, comprising:
   scanning an area with N lines photosensors, where N is even and at least six, where each line of photosensors has a corresponding line of photosensors that is spatially offset by substantially one-half a pitch of the photosensors, and where each of the lines of photosensors receives a different spectral bandwidth of light.

7. A method of scanning, comprising:
   scanning an area with N photosensors, where N is even and at least six, where some the photosensors are a first size and the remaining photosensors are a second size, and the first and second sizes are different, and where each of the photosensors receives a different spectral bandwidth of light;
   obtaining M bits of intensity data from each photosensor; and
   combining the intensity data to obtain M times N bits of intensity data for the area.

8. The method of claim 7, further comprising:
   using a transformation matrix to reduce the M times N bits of intensity data to M times N/2 bits of intensity data.

* * * * *

UNITED STATES PATENT AND TRADEMARK OFFICE
CERTIFICATE OF CORRECTION

PATENT NO. : 7,154,545 B2  
APPLICATION NO. : 09/845391  
DATED : December 26, 2006  
INVENTOR(S) : Robert G Gann et al.

Page 1 of 1

It is certified that error appears in the above-identified patent and that said Letters Patent is hereby corrected as shown below:

In column 9, line 36, in Claim 3, delete "," before "have".

In column 10, line 10, in Claim 5, delete "size:" and insert -- size; --, therefor.

In column 10, line 21, in Claim 6, after "lines" insert -- of --.

Signed and Sealed this

Fifth Day of May, 2009

JOHN DOLL  
*Acting Director of the United States Patent and Trademark Office*